Dec. 5, 1967  J. A. CUNNINGHAM  3,355,792
PIPE COME-ALONG APPARATUS
Filed July 16, 1965  2 Sheets-Sheet 1

INVENTOR.
Joseph A. Cunningham
BY
Hovey, Schmidt, Johnson & Hovey,
ATTORNEYS.

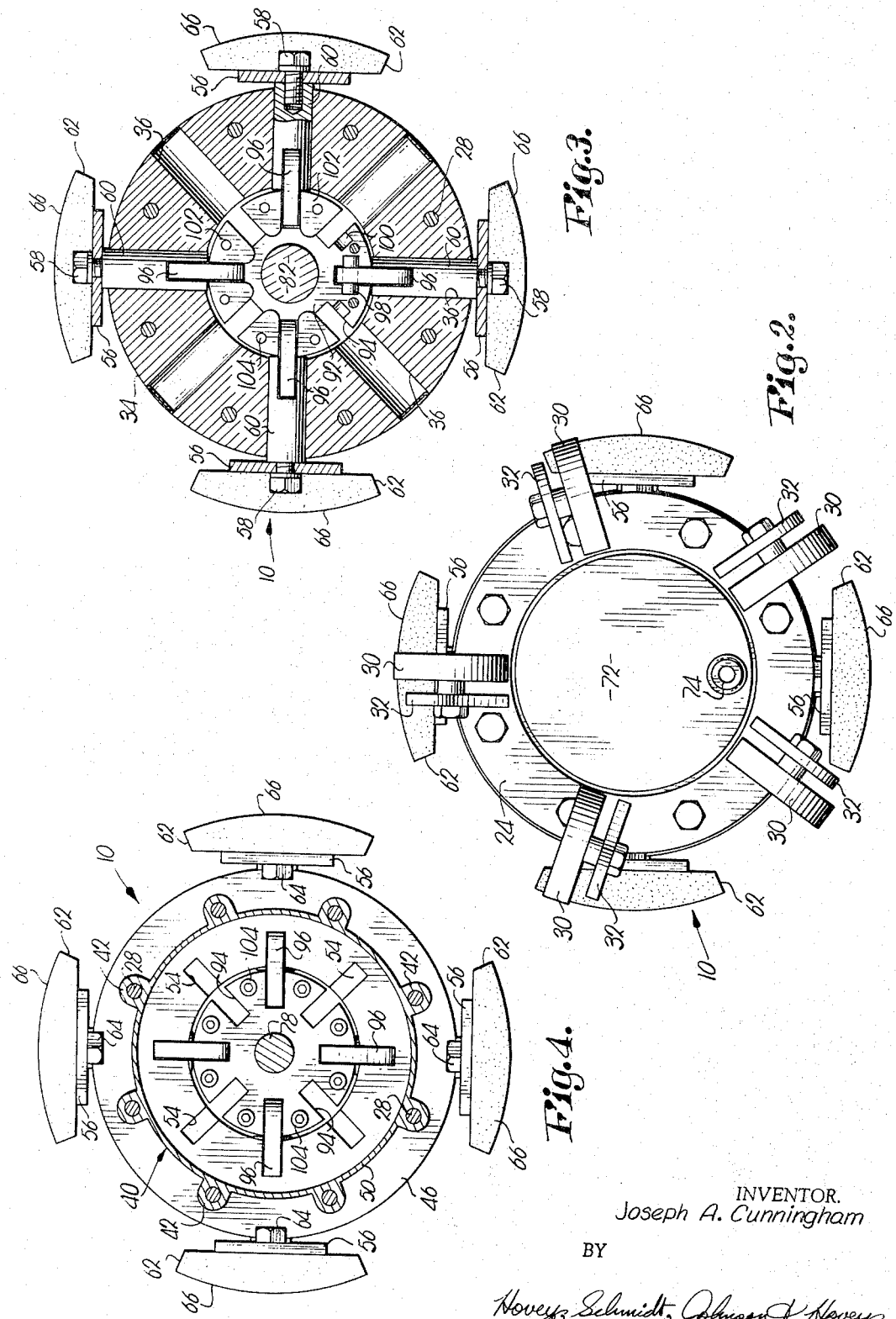

United States Patent Office 3,355,792
Patented Dec. 5, 1967

3,355,792
PIPE COME-ALONG APPARATUS
Joseph A. Cunningham, Tulsa, Okla., assignor to Crose-United Corporation, Tulsa, Okla., a corporation of Oklahoma
Filed July 16, 1965, Ser. No. 472,607
6 Claims. (Cl. 29—237)

ABSTRACT OF THE DISCLOSURE

A pipe come-along unit compressing an elongated, wheeled carriage adapted to be moved into the proximal ends of a pair of end-to-end pipe sections. A plurality of stub shafts are mounted in circumferentially spaced passages intermediate the ends of the carriage for radial movement toward and away from the inner surfaces of said pipe sections. An elongated, longitudinally aligned, resilient bar is mounted intermediate its ends on the outermost end of each stub shaft. Each bar has a pair of longitudinally spaced, yieldable pads mounted on its outer surface and fluid cylinder and piston means is operably coupled through linkage with each stub shaft for moving the latter to force said pads into frictional engagement with the inner surfaces of the corresponding abutting pipe sections for releasably clamping the same together.

---

This invention relates to pipe coupling equipment and, more particularly, to an improved pipe come-along unit for use with a pipe coating and wrapping machine.

When the outer surfaces of pipe sections are to be coated and wrapped they are directed toward and through a machine designed for this purpose. In moving through the machine, the pipe sections are rotated as they are advanced since this is the most advantageous way in which to both coat and wrap the pipe sections. It has been found that the coating and wrapping steps may be enhanced by the use of a device known as a come-along inserted within the proximal ends of a pair of pipe sections disposed in end-to-end relationship so that, as one pipe section is being coated and wrapped, the other pipe section is moving toward the machine preparatory to being subsequently coated and wrapped.

Several different types of come-alongs have been satisfactorily employed with pipe sections of relatively small dimensions. However, for pipe sections having diameters of approximately 16 inches and larger, the conventional come-alongs are ineffective inasmuch as such relatively large pipe sections are not necessarily in round, and the conventional come-alongs do not compensate for irregularities in the cross section of the pipe. Also, conventional come-alongs must be moved from the end of a pipe section entering the machine and carried externally of this pipe section to the junction between the latter and the following pipe so that the coating and wrapping operation can be resumed.

Another disadvantage of the conventional type of come-along is the fact that it requires that the two pipe sections which are joined thereby have a definite diameter and wall thickness. Where pipe sections of different diameters are encountered, the come-alongs are either too loose or too tight, and hence, ineffective in interconnecting the pipe sections together.

The present invention provides a come-along which circumvents the aforesaid disadvantages of conventional come-alongs by providing means whereby a pair of pipe sections may be effectively joined together notwithstanding variations in wall thicknesses and diameters of the interconnected pipe sections. To accomplish this, the invention includes a pair of longitudinally spaced, pipe-engaging pads of resilient material at each of a number of pipe-engaging stations, the pads being movable into and out of engagement with the inner surfaces of respective pipe sections to be joined together when the latter are in end-to-end relationship. The resilience of the pads compensates for the slight variations in diameter and wall thickness, as well as for irregularities in the transverse cross sections of each length of pipe inasmuch as one pad at each station may be compressed to a greater or lesser degree than the other pad. The pipe sections will remain rigidly interconnected notwithstanding this difference in the amount of pad compression. Moreover, each pair of pads are mounted on a resilient bar adjacent respective ends thereof, each bar being capable of deflection by different amounts at its ends to also compensate for diameter and wall thickness variations of the interconnected lengths of pipe.

It is, therefore, the primary object of this invention to provide an improved come-along unit which is capable of interconnecting a pair of pipe sections in end-to-end alignment, notwithstanding small variations in wall thickness and diameter of the sections as well as an out-of-round condition in one or both of the pipe sections due to irregularities in cross section thereof.

Another object of this invention is the provision of a come-along of the aforesaid character wherein a number of circumferentially spaced, resilient pads are engageable with the inner surface of each pipe section adjacent the junction between a pair of pipe sections, whereby the pads may be compressed as necessary to compensate for the above-mentioned variations and irregularities while, at the same time, the proximal ends of the pair of pipe sections are rigidly interconnected to permit the sections to be moved toward and into a pipe coating and wrapping machine.

Still another object of the present invention is the provision of a come-along which, through the use of a reach rod and means for remotely controlling the come-along, the latter may be moved through a pipe section from one pipe joint to another to thereby obviate the removal of the come-along from the pipe section and the carrying thereof to the second joint.

A further object of this invention is the provision of a come-along in which all of the components thereof are connected together as a unit for movement into the proximal ends of a pair of pipe sections in end-to-end relationship whereby to circumvent the disadvantages of conventional come-alongs which require the placement of separate pipe-engaging devices in the proximal ends of the pair of pipe sections and the joining of the devices together thereafter.

In the drawings:

FIG. 2 is an elevational view of one end of the come-along;

FIG. 3 is a cross-sectional view taken along line 3—3 of FIG. 1;

FIG. 4 is a cross-sectional view taken along line 4—4 of FIG. 1; and

Figure 1:
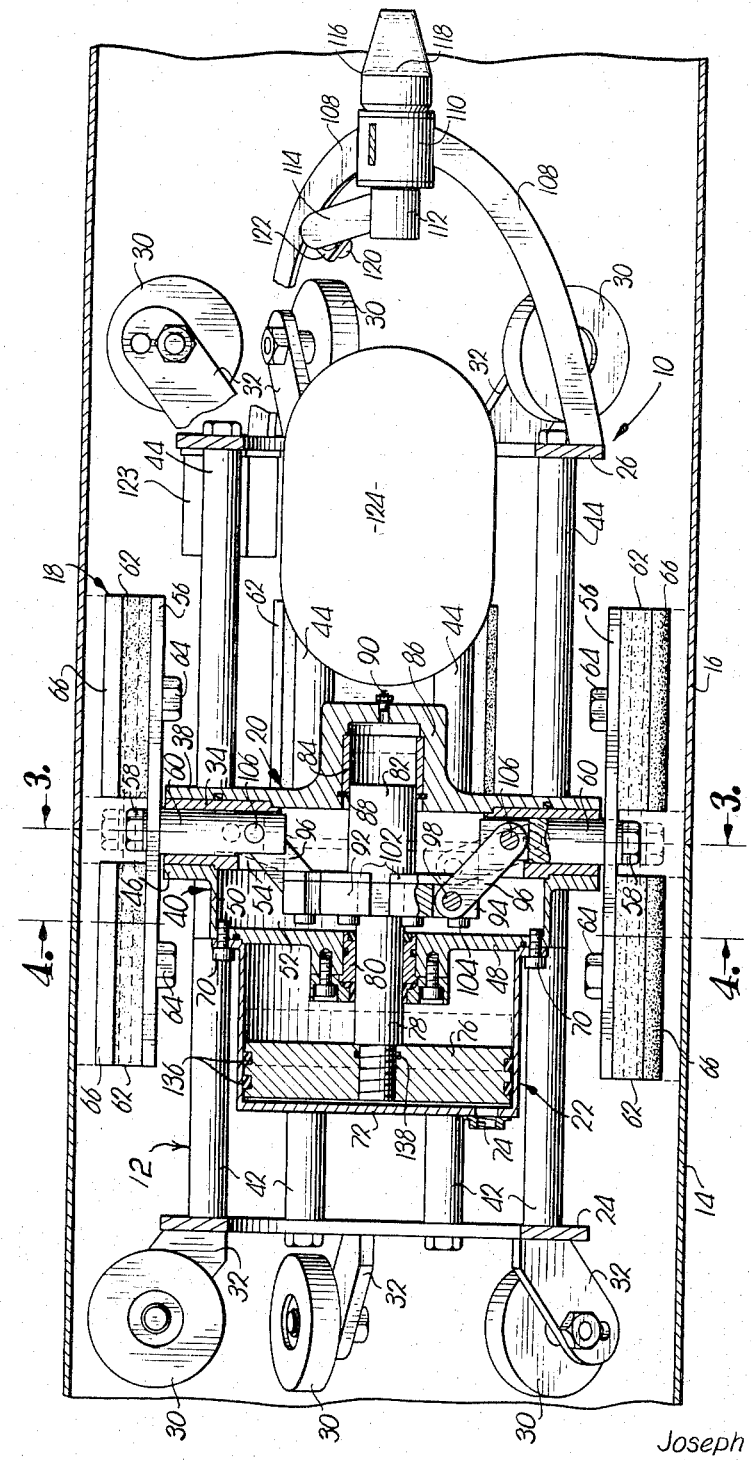
FIGURE 1 is a vertical section through a come-along made pursuant to the concepts of the present invention and illustrating the way in which the same is disposed within and interconnects a pair of pipe sections in end-to-end relationship.

Come-along 10 includes an elongated support or carriage 12 movable into the proximal ends of a pair of pipe sections 14 and 16 disposed in end-to-end relationship with each other, resilient structure 18 carried by mounting means 20 on carriage 12 and power means 22 coupled with structure 18 for moving the latter transversely of the longitudinal axis of carriage 12 and into and out of frictional engagement with the inner surfaces of pipe sections 14 and 16 to rigidly interconnect the latter. Come-along 10 is especially suitable for use with a pipe coating and wrapping machine wherein pipe sections passing through the machine are rotated, as well as advanced so that a spiral wrapping may be applied to the outer surface of the section after the same has been coated.

Carriage 12 may be of any suitable construction but, for purposes of illustration, includes a pair of longitudinally spaced, annular rings 24 and 26 which are rigidly interconnected by a plurality of circumferentially spaced, longitudinally extending rods 28 as shown in FIG. 1. A number of rollers 30 are connected by mounts 32 to each ring 24 and 26 respectively and are engageable with the inner surface of pipe sections 14 and 16 to facilitate the movement of come-along 10 therethrough. Rollers 30 are preferably formed from a material which does not mar the inner surfaces of sections 14 and 16. Rollers made of hard rubber have been found to be suitable for this purpose. Moreover, rollers 30 are suitably spaced about the respective ring to permit come-along 10 to be moved through a pipe section in any position.

Mounting means 20 includes an annular ring 34 having sufficient thickness to permit inclusion of a number of radially disposed, circumferentially spaced bores 36 therein as shown in FIGS. 1 and 3. A pair of spaced end plates 38 and 40 are disposed on opposed sides of ring 34 in the manner illustrated in FIG. 1. Ring 34 and plates 38 and 40 are provided with circumferentially spaced, longitudinally extending holes (not shown) therethrough for receiving rods 28. A first set of spacers 42 span the distance between ring 24 and plate 40, and a second set of spacers 44 span the distance between plate 38 and ring 26, spacers 42 and 44 being disposed on respective rods 28. Thus, ring 34 and plates 38 and 40 are fixedly positioned to carriage 12 intermediate rings 24 and 26.

Plate 40 includes an annular portion 46 interconnected to a central portion 48 by a longitudinally extending flange 50 integral with portions 46 and 48. Flange 50 defines a space 52 which receives a movable component hereinafter described forming a part of power means 22. Ring 34 is provided with radial slots 54 therein for clearing additional movable components of power means 22.

Structure 18 includes a number of circumferentially spaced leaf springs or resilient bars 56, each of which is secured by bolt means 58 to the outer end of a respective stub shaft 60 disposed within and movable relative to a corresponding bore 36 of ring 34. For purposes of illustration, four stub shafts 60 are provided at 90° intervals in respective bores 36 as shown in FIG. 3, although four additional bores 36 are also provided and could be used for receiving respective stub shafts 60 if desired.

A pair of pads 62 are mounted on each bar 56 respectively by bolt means 64, whereby pads 62 are adjacent to respective ends of each bar 56. As shown in FIGS. 2-4 each pad 62 has a convex outer surface 66 which is adapted to engage the inner surface of a respective pipe section when the corresponding stub shaft 60 is forced radially outwardly by power means 22 in a manner to be described. Each pad 62 is formed from a resilient material such as rubber or the like, so that it will be deformed to a certain extent when forced into engagement with the corresponding pipe section. Pads 62 are separated from each other and are disposed on opposed sides of the respective bolt means 58 whereby one pad 62 is adapted to engage the inner surface of pipe section 14, whereas the other pad 62 is adapted to engage the inner surface of pipe section 16. Also, the resilience of each bar 56 permits the latter to be deflected if necessary in the event that the wall thicknesses and diameters of pipe sections 14 and 16 are not the same. Thus, structure 18 at each pipe-engaging station has two degrees of freedom, namely, the compression of pads 62 and the deflection of one or both ends of the corresponding bar 56.

Power means 22 is provided to move stub shafts 60 in opposed directions relative to ring 34, whereby pads 62 are moved alternately into and out of frictional engagement with the inner surfaces of pipe sections 14 and 16. When pads 62 are in engagement with the sections 14 and 16, the latter are rigidly interconnected and may be moved together as a unit when one of the pipe sections is being coated and wrapped by a machine designed for this purpose.

Power means 22, in this case, includes a cylinder 68 secured by bolt means 70 to portion 48 of plate 40. An end wall 72 closes the outer end of cylinder 68 and is provided with a fitting 74 whereby a pipe or hose connection may be made thereto. Air or other fluid under pressure directed through the pipe or hose will be admitted to the interior of cylinder 68 to force the piston 76 therewithin toward portion 48. A main shaft or piston rod 78 threaded to piston 76 extends through a packing 80 carried by portion 48 and projects into space 52 in the manner shown in FIG. 1. An enlarged segment 82 of rod 78 is received within a sleeve 84 releasably retained within a tubular extension 86 by a retainer ring 88 or the like. Sleeve 84 provides a support for segment 82. A port 90 in the end of extension 86 permits air to enter into and discharge from extension 86 as piston 76 moves toward and away from end wall 72.

A circular element 92 is carried by and is concentric with rod 78 adjacent segment 82 as shown in FIG. 1. Element 92 has a number of circumferentially spaced slots 94 which movably receive respective links 96. A shaft 98 extends through each link 96 respectively and is complementally received within a pair of grooves 100 disposed within element 92 on opposed sides of each slot 94 respectively. Grooves 100 extend to one end face of element 92 as shown in FIG. 1 to permit shafts 98 to be inserted in place with respective links 96 thereof within corresponding slots 94. A triangular plate 102 is provided to cover a pair of proximal grooves 100 corresponding to a pair of adjacent slots 94. Plates 102 are secured to element 92 by screws 104 as shown in FIGS. 1, 3 and 4.

Links 96 are pivotal with respect to element 92 and are connected at their opposite ends to the inner ends of respective stub shafts 60 by transverse pins 106. Thus, as rod 78 moves to the right when viewing FIG. 1, links 96 will move from the full-line positions thereof to the dashed-line positions to, in turn, move pads 62 and bars 56 into their dashed-line positions as shown in FIG. 1. In these positions pads 62 frictionally engage the inner surfaces of sections 14 and 16 to rigidly interconnect the latter in end-to-end relationship.

A number of rigid, elongated projections 108 are secured at proximal ends thereof to ring 26 and extend outwardly therefrom. Projections 108 converge and terminate at a hub 110 which rotatably mounts a shaft (not shown) carrying a collar 112 having a finger 114 projecting laterally therefrom. At the opposite end of the shaft a coupling 116, having a transverse opening 118 therethrough is provided to receive a reach rod within opening 118, whereby collar 112 and finger 114 may be rotated about the axis of hub 110.

Finger 114 is adapted to alternately engage and actuate a pair of spaced electrical switches 120, only one of which is shown in FIG. 1. Each switch 120 is carried by a bracket 122 secured to a proximal projection 108. In addition, switches 120 are adapted to be operably coupled to an electrically actuated fluid valve 123 carried by ring 26 which controls the flow of a fluid under pressure from a pressure tank 124, and also controls the venting of the space between piston 76 and end wall 72 to the atmosphere. For purposes of illustration, tank 124 is supported in any suitable manner adjacent to plate 38 and extends partially through ring 26 as shown in FIG. 1. Thus, when finger 114 actuates one of the switches 120, fluid under pressure is supplied to cylinder 68 to move piston 76 to the right when viewing FIG. 1. When finger 114 is rotated and engages the other switch 120, the supply of fluid under pressure to cylinder 68 is cutoff and the latter is vented to the atmosphere whereby piston 76 may move toward end wall 72 under the restoring forces due to the deformations of pads 62. Rotation of finger 114 is, of course, accomplished by the manipulation of the reach rod attached to coupling 116.

Figure 5:
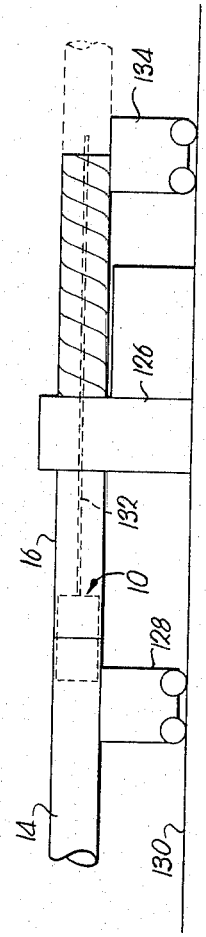
FIG. 5 is a schematic view of a pipe coating and wrapping machine and a number of aligned pipe sections coupled by come-alongs of the present invention passing through the machine.

In use, a pair of pipe sections interconnected by come-along 10 are moved relative to a pipe coating and wrapping machine 126 in the manner shown schematically in FIG. 5. In this connection, section 16 is being coated and wrapped by machine 126 as section 14 follows by being supported by a movable vehicle 128 on a supporting surface 130.

A reach rod 132 is shown extending through section 16 to illustrate the way in which come-along 10 is to be moved to the junction between sections 14 and 16. Reach rod 132 is, of course, accessible to the right-hand end of pipe section 16 so that coupling 116 may be rotated to, in turn, move finger 114 alternately into engagement with switches 120.

Come-along 10 is moved through section 16 inasmuch as certain of the rollers 30 connected to rings 24 and 26 engage the inner surfaces of sections 14 and 16. When come-along 10 is at the proper location extending into the proximal ends of sections 14 and 16, the fluid valve associated with switches 120 is actuated to direct high pressure fluid from tank 124 into cylinder 68. Piston 76 is then moved to the right when viewing FIG. 1 to, in turn, cause links 96 to force stub shafts 60 outwardly. Pads 62 thereby are forced into frictional engagement with the inner surfaces of sections 14 and 16 at circumferentially spaced locations thereon. Pads 62 are compressed by virtue of their resilient construction whereby sections 14 and 16 are effectively rigidly interconnected and will rotate relative to and advance through machine 126 as a unit.

If there are variations in the wall thicknesses and diameters of sections 14 and 16, the deformations of pads 62 will compensate for these variations inasmuch as the pads 62 on each bar 56 engage respective pipe sections 14 and 16. Also, irregularities in the cross sections of pipe sections 14 and 16 are compensated for by these pad deformations.

Bars 56 may be deflected to a certain degree if necessary in order to augment the compensating action of pads 62. Thus, if one of the pipe sections is out-of-round with respect to the other pipe section, bars 56 may be deflected due to their resilience to assure that pads 62 are in frictional engagement with the inner surfaces of respective pipe sections. These two degrees of freedom of structure 18 thereby assure an effective rigid interconnection, notwithstanding the aforesaid variations and irregularities.

After pipe section 16 has been coated, reach rod 132 is rotated so that finger 114 actuates the other switch 120. This action vents cylinder 68 to the atmosphere whereby piston 76 moves toward end wall 72 to, in turn, move stub shafts 60 inwardly. Pads 62, therefore, move out of frictional engagement with sections 14 and 16, and carriage 12 may then be moved longitudinally of and through pipe section 14 to the junction between the latter and the following pipe section. This is, of course, accomplished after pipe section 16 has been separated from section 14. A vehicle 134 similar in all respects to vehicle 128 is provided for moving section 16 away from section 14.

Come-along 10 provides an effective means wherein all of the components thereof are connected together as a unit. Thus, this construction obviates the use of conventional equipment wherein a pair of independently pipe-engaging devices are first placed in and are secured to the proximal ends of the pair of pipe sections and are subsequently connected together to thereby interconnect the pipe sections.

It is to be noted that suitable seals are provided in the fluid circuitry of come-along 10 to prevent leakage of the fluid under pressure. For instance, seals 136 are provided on piston 76 at the outer periphery thereof, and a seal 138 is provided at the junction of piston 36 with piston rod 78.

Having thus described the invention, what is claimed as new and desired to be secured by Letters Patent is:

1. Apparatus for coupling a pair of pipe sections together in end-to-end relationship comprising:
   an elongated carriage adapted to be moved relative to and to extend into the proximal ends of a pair of pipe sections disposed in end-to-end relationship;
   a plurality of stub shafts mounted on said carriage for movement along respective paths of travel radially outwardly from said carriage toward the inner surface of said pipe sections;
   pipe engaging means including a resilient bar for each stub shaft respectively, the bars being secured to the outer ends of respective stub shafts intermediate the ends of the bars and being disposed longitudinally of said carriage; and
   power means mounted on said carriage and coupled with said stub shafts for moving the same in opposed directions relative to said carriage to thereby move said pipe engaging means into and out of frictional engagement with the inner surfaces of respective pipe sections when the latter are disposed in end-to-end relationship and said carriage is disposed at the junction of said pipe sections.

2. Apparatus as set forth in claim 1 wherein said pipe engaging means includes a yieldable pad mounted on the outermost surface of each resilient bar respectively.

3. Apparatus as set forth in claim 2, there being a pair of pads for each bar, said pads being spaced longitudinally of the corresponding bar.

4. Apparatus as set forth in claim 1, said carriage including means defining a plurality of circumferentially spaced, radially disposed passages intermediate the ends of the carriage, there being stub shafts for each passage respectively, the stub shafts being disposed within and movable relative to respective passages.

5. Come-along apparatus for connecting a pair of pipe sections together in end-to-end relationship comprising:
   an elongated carriage having a number of pipe-engaging rollers thereon and adapted to be moved relative to and to extend into the proximal ends of a pair of pipe sections disposed in end-to-end relationship;
   means defining a plurality of circumferentially spaced, radially disposed passages;
   means mounting said passage defining means on said carriage intermediate the ends thereof;
   a stub shaft for each passage respectively, the stub shafts being disposed within and movable relative to respective passages;
   a resilient bar for each stub shaft respectively, the bars being secured to the outer ends of respective stub shafts and being disposed longitudinally of said carriage;
   a pair of resilient, pipe-engaging pads for each bar respectively, each pair of pads being secured to the outer face of the respective bar adjacent corresponding ends of the latter; and
   power means mounted on said carriage and coupled with said stub shafts for moving the same in opposed directions relative to said carriage to thereby move said pads into and out of frictional engagement with the inner surfaces of respective pipe sections when the latter are disposed in end-to-end relationship and said carriage is disposed at the junction of said pipe sections.

6. Come-along apparatus as set forth in claim 5, wherein said power means includes a fluid piston and cylinder assembly, means for coupling said assembly to a source of fluid under pressure, a fluid valve for controlling the flow of fluid to and from said assembly, actuatable means coupled with said valve for controlling the same, and rod means adapted to extend into and through one of said pipe sections for actuating said control means, said rod means being coupled with said carriage for moving the latter through a first of said pipe sections.

References Cited

UNITED STATES PATENTS

| | | | |
|---|---|---|---|
| 136,751 | 3/1873 | Nevill | 294—93 |
| 2,610,888 | 9/1952 | Pace | 294—93 |
| 2,826,445 | 3/1958 | Tidland | 294—93 |
| 3,088,769 | 5/1963 | Richardson | 294—93 |
| 3,233,315 | 2/1966 | Levake | 29—237 |

OTHELL M. SIMPSON, *Primary Examiner.*

J. C. PETERS, *Assistant Examiner.*